United States Patent
Yu

(10) Patent No.: US 9,286,847 B2
(45) Date of Patent: Mar. 15, 2016

(54) REPAIRABLE GOA CIRCUIT AND DISPLAY DEVICE FOR FLAT PANEL DISPLAY

(71) Applicant: Shenzhen China Star Optoelectronics Technology Co., Ltd., Shenzhen, Guangdong (CN)

(72) Inventor: Xiaojiang Yu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 120 days.

(21) Appl. No.: 14/348,858

(22) PCT Filed: Jan. 21, 2014

(86) PCT No.: PCT/CN2014/070955
§ 371 (c)(1),
(2) Date: Mar. 31, 2014

(87) PCT Pub. No.: WO2015/096246
PCT Pub. Date: Jul. 2, 2015

(65) Prior Publication Data
US 2015/0294636 A1 Oct. 15, 2015

(30) Foreign Application Priority Data
Dec. 26, 2013 (CN) .......................... 2013 1 0733733

(51) Int. Cl.
*G09G 3/36* (2006.01)
*G02F 1/133* (2006.01)
*G09G 3/20* (2006.01)

(52) U.S. Cl.
CPC .............. *G09G 3/3655* (2013.01); *G02F 1/133* (2013.01); *G09G 3/20* (2013.01); *G09G 3/36* (2013.01); *G09G 3/3677* (2013.01); *G09G 3/3688* (2013.01); *G09G 3/3696* (2013.01); *G09G 2300/0408* (2013.01); *G09G 2300/0876* (2013.01); *G09G 2310/0205* (2013.01);
(Continued)

(58) Field of Classification Search
None
See application file for complete search history.

(56) References Cited

U.S. PATENT DOCUMENTS

| 2007/0164972 A1* | 7/2007 | Chang | G09G 3/3677 345/100 |
| 2008/0079676 A1* | 4/2008 | Pak | G09G 3/3677 345/87 |

(Continued)

*Primary Examiner* — Kent Chang
*Assistant Examiner* — Nathan Brittingham
(74) *Attorney, Agent, or Firm* — Andrew C. Cheng

(57) ABSTRACT

The present invention discloses a repairable GOA circuit and a display device for flat panel display. The repairable GOA circuit for flat panel display comprises multiple GOA units cascaded with each other, charging an n-th level horizontal scanning line in the display region according to the n-th level GOA unit, both ends of the n-th level horizontal scanning line being connected with one said n-th level GOA unit. The n-th level GOA unit comprises a pull-up circuit, a pull-down circuit, a pull-down holding circuit, a pull-up control circuit, a boost strap capacitor, and a first thin film transistor. The gate of the first thin film transistor inputting a level clock signal CK, the drain and the source thereof being respectively connected with the gate signal point and the n-th level horizontal scanning line. When the n-th level GOA unit is working normally, at least one of the drain and the source of the first thin film transistor keeps disconnected with the n-th level GOA unit. The present invention further provides a corresponding display device. The repairable GOA circuit for flat panel display according to the present invention makes the GOA circuit have a certain repair ability, which improves the yield of the GOA display panel.

14 Claims, 5 Drawing Sheets

(52) U.S. Cl.
CPC .............. *G09G2310/0213* (2013.01); *G09G 2310/0267* (2013.01); *G09G 2320/0204* (2013.01); *G09G 2330/08* (2013.01)

(56) References Cited

U.S. PATENT DOCUMENTS

| | | | | |
|---|---|---|---|---|
| 2010/0214279 A1* | 8/2010 | Kim | ............... | G09G 3/344 345/213 |
| 2011/0199355 A1* | 8/2011 | Watanabe | ............ | G09G 3/3688 345/211 |
| 2011/0199363 A1* | 8/2011 | Lee | ............... | G09G 3/3677 345/212 |
| 2011/0234577 A1* | 9/2011 | Yang | ............... | G09G 3/3677 345/212 |
| 2013/0141315 A1* | 6/2013 | Chen | ............... | G11C 19/184 345/55 |
| 2013/0280822 A1* | 10/2013 | Su | ............... | B23K 26/0042 438/4 |
| 2014/0079173 A1* | 3/2014 | Yan | ............... | G11C 19/28 377/64 |
| 2014/0103983 A1* | 4/2014 | Chang | ............ | G09G 3/3655 327/198 |
| 2014/0111413 A1* | 4/2014 | Chen | ............... | G11C 19/28 345/100 |
| 2014/0176410 A1* | 6/2014 | Ma | ............... | G09G 3/3622 345/92 |

\* cited by examiner

REPAIRABLE GOA CIRCUIT AND DISPLAY DEVICE FOR FLAT PANEL DISPLAY

BACKGROUND OF THE INVENTION

1. Field of the Invention

The present invention relates to the field of flat panel display technology, and in particular to a repairable gate driver on array (GOA) circuit and a display device for flat panel display.

2. the Related Arts

At present, the horizontal scanning lines of the active matrix liquid crystal display panel are mainly driven by the external IC of the panel. The external IC of the panel can control the horizontal scanning line connected with each level pixel of the panel to charge and discharge level by level. However, the gate driver on array (GOA) use the existing thin film transistor liquid crystal display array process to produce the horizontal scanning driving circuit on the substrate around the display area, which replaces the external IC to drive the horizontal scanning line. The GOA technology can simplify the manufacturing processes of the display panel, reduce the bonding process of the IC in the direction of the horizontal scanning line, have chance to improve the capacity and decrease the product cost, and improve the integration of the flat display panel to make it more suitable for the production of narrow border or borderless display products, which is widely attracted in the field of flat panel display in recent years.

The existing GOA circuit usually comprises multiple GOA units cascaded with each other. Each level GOA unit correspondingly drives one-level horizontal scanning line. GOA unit mainly comprises a pull-up part, a pull-up control part, a transfer part, a key pull-down part, a pull-down holding part, and a boost strap capacitor used to boost potential. The pull-up part is mainly used to output clock signal into gate signal; the pull-up control part is mainly used to control the turning-on time of the pull-up part, which is usually connected with the transfer signal or the gate signal transferred from the former level GOA circuit; the pull-down part is used to pull-down the gate to low potential at a first time, that is, close the gate signal; the pull-down holding part is used to hold the gate output signal and the gate signal (usually called as Q point) of the pull-up part in the off state (negative potential), which usually has two pull-down holding modules working alternately; the boast capacitor is used to twice boost the Q point, which is beneficial to the G(N) output of the pull-up part.

However, the current GOA technology has some limitations. For example, the gate driver circuit of GOA is difficult to effectively repair, and the invalid of the partial gate driver circuit will lead to the failure of the entire display panel and decrease the product yield. Therefore, it is important for the promotion of GOA technology to develop a gate driver circuit with a certain repair ability.

SUMMARY OF THE INVENTION

The object of the present invention is to provide a repairable GOA circuit for flat panel display, which makes the GOA circuit have a certain repair ability, and improves the yield of the GOA display panel.

The object of the present invention is to provide a display device with the repairable GOA circuit for flat panel display, which improves the yield of the GOA display panel.

In order to achieve the above object, the present invention provides a repairable GOA circuit for flat panel display, comprising multiple GOA units cascaded with each other, charging an n-th level horizontal scanning line in the display region according to the n-th level GOA unit, both ends of the n-th level horizontal scanning line being connected with one said n-th level GOA unit, the n-th level GOA unit comprising a pull-up circuit, a pull-down circuit, a pull-down holding circuit, a pull-up control circuit, a boost strap capacitor, and a first thin film transistor; the pull-up circuit, the pull-down circuit, the pull-down holding circuit, and a boost strap capacitor being respectively connected with a gate signal point and the n-th level horizontal scanning line, the pull-up control circuit being connected with the gate signal point; the gate of the first thin film transistor inputting a level clock signal, the drain and the source thereof being respectively connected with the gate signal point and the n-th level horizontal scanning line; wherein, when the n-th level GOA unit is working normally, at least one of the drain and the source of the first thin film transistor keeps disconnected with the n-th level GOA unit, when the pull-down holding circuit is abnormal, isolate the pull-down holding circuit from the n-th level GOA unit, and completely connect the first thin film transistor to the n-th level GOA unit to finish repair.

Wherein, the pull-down holding circuit is isolated from the n-th level GOA unit by laser fusing.

Wherein, the metal wires connected with the drain or the source of the first thin film transistor intersect with the metal wires connected with the corresponding gate signal point or the n-th level horizontal scanning line, which are separated by an insulating layer.

Wherein, the first thin film transistor is completely connected to the n-th level GOA unit by laser welding.

Wherein, the pull-up control circuit comprises:
a second thin film transistor, the gate thereof being connected with the (n−2)-th level horizontal scanning line, the drain and the source thereof being respectively connected with the (n−2)-th level horizontal scanning line and the gate signal point; and
a third thin film transistor, the gate thereof being connected with the (n−1)-th level horizontal scanning line, the drain and the source thereof being respectively connected with the (n−1)-th level horizontal scanning line and the gate signal point.

Wherein, the pull-down holding circuit further comprises:
a fourth thin film transistor, the gate thereof being connected with a first circuit point, the drain and the source thereof being respectively connected with the n-th level horizontal scanning line and inputting a DC low voltage;
a fifth thin film transistor, the gate thereof being connected with a second circuit point, the drain and the source thereof being respectively connected with the n-th level horizontal scanning line and inputting the DC low voltage;
a sixth thin film transistor, the gate thereof being connected with the first circuit point, the drain and the source thereof being respectively connected with the (n−1)-th level horizontal scanning line and inputting the gate signal point;
a seventh thin film transistor, the gate thereof being connected with the second circuit point, the drain and the source thereof being respectively connected with the (n−1)-th level horizontal scanning line and inputting the gate signal point;
an eighth thin film transistor, the gate thereof being connected with the gate signal point, the drain and the source thereof being respectively connected with the first circuit point and inputting the DC low voltage;
an ninth thin film transistor, the gate thereof being connected with the gate signal point, the drain and the source thereof being respectively connected with the second circuit point and inputting the DC low voltage;

an tenth thin film transistor, the gate thereof inputting a first clock signal, the drain and the source thereof inputting the first clock signal and being respectively connected with the first circuit point;

an eleventh thin film transistor, the gate thereof inputting a second clock signal, the drain and the source thereof inputting the first clock signal and being respectively connected with the first circuit point;

an twelfth thin film transistor, the gate thereof inputting the second clock signal, the drain and the source thereof respectively inputting the second clock signal and being connected with the second circuit point; and an thirteenth thin film transistor, the gate thereof inputting the first clock signal, the drain and the source thereof respectively inputting the second clock signal and being connected with the second circuit point;

wherein, when working, the frequencies of the first clock signal and the second clock signal are lower than the level clock signal, and first circuit point and the second circuit point are alternately charged to the high potential by the first clock signal and the second clock signal.

Wherein, the pull-up circuit further comprises:

a fourteenth thin film transistor, the gate thereof being connected with the gate signal point, the drain and the source thereof respectively inputting the level clock signal and being connected with the n-th horizontal scanning line.

Wherein, the pull-down circuit comprises:

a fifteenth thin film transistor, the gate thereof being connected with the (n+2)-th horizontal scanning line, the drain and the source thereof being respectively connected with the n-th level horizontal scanning line and inputting the gate signal point; and a sixteenth thin film transistor, the gate thereof being connected with the (n+2)-th horizontal scanning line, the drain and the source thereof being respectively connected with the gate signal point and inputting the gate signal point.

Wherein, the first clock signal, the second clock signal, or the DC low voltage are respectively input into the multiple GOA units cascaded with each other through a common metal wire.

The present invention further provides a repairable GOA circuit for flat panel display, comprising multiple GOA units cascaded with each other, charging an n-th level horizontal scanning line in the display region according to the n-th level GOA unit, both ends of the n-th level horizontal scanning line being connected with one said n-th level GOA unit, the n-th level GOA unit comprising a pull-up circuit, a pull-down circuit, a pull-down holding circuit, a pull-up control circuit, a boost strap capacitor, and a first thin film transistor; the pull-up circuit, the pull-down circuit, the pull-down holding circuit, and a boost strap capacitor being respectively connected with a gate signal point and the n-th level horizontal scanning line, the pull-up control circuit being connected with the gate signal point; the gate of the first thin film transistor inputting a level clock signal, the drain and the source thereof being respectively connected with the gate signal point and the n-th level horizontal scanning line;

wherein, when the n-th level GOA unit is working normally, at least one of the drain and the source of the first thin film transistor keeps disconnected with the n-th level GOA unit, when the pull-down holding circuit is abnormal, isolate the pull-down holding circuit from the n-th level GOA unit, and completely connect the first thin film transistor to the n-th level GOA unit to finish repair;

wherein, the pull-down holding circuit is isolated from the n-th level GOA unit by laser fusing;

wherein, the metal wires connected with the drain or the source of the first thin film transistor intersect with the metal wires connected with the corresponding gate signal point or the n-th level horizontal scanning line, which are separated by an insulating layer;

wherein, the first thin film transistor is completely connected to the n-th level GOA unit by laser welding;

wherein, the pull-up control circuit comprises:

a second thin film transistor, the gate thereof being connected with the (n−2)-th level horizontal scanning line, the drain and the source thereof being respectively connected with the (n−2)-th level horizontal scanning line and the gate signal point; and a third thin film transistor, the gate thereof being connected with the (n−1)-th level horizontal scanning line, the drain and the source thereof being respectively connected with the (n−1)-th level horizontal scanning line and the gate signal point.

Wherein, the pull-down holding circuit further comprises:

a fourth thin film transistor, the gate thereof being connected with a first circuit point, the drain and the source thereof being respectively connected with the n-th level horizontal scanning line and inputting a DC low voltage;

a fifth thin film transistor, the gate thereof being connected with a second circuit point, the drain and the source thereof being respectively connected with the n-th level horizontal scanning line and inputting the DC low voltage;

a sixth thin film transistor, the gate thereof being connected with the first circuit point, the drain and the source thereof being respectively connected with the (n−1)-th level horizontal scanning line and inputting the gate signal point;

a seventh thin film transistor, the gate thereof being connected with the second circuit point, the drain and the source thereof being respectively connected with the (n−1)-th level horizontal scanning line and inputting the gate signal point;

an eighth thin film transistor, the gate thereof being connected with the gate signal point, the drain and the source thereof being respectively connected with the first circuit point and inputting the DC low voltage;

an ninth thin film transistor, the gate thereof being connected with the gate signal point, the drain and the source thereof being respectively connected with the second circuit point and inputting the DC low voltage;

an tenth thin film transistor, the gate thereof inputting a first clock signal, the drain and the source thereof inputting the first clock signal and being respectively connected with the first circuit point;

an eleventh thin film transistor, the gate thereof inputting a second clock signal, the drain and the source thereof inputting the first clock signal and being respectively connected with the first circuit point;

an twelfth thin film transistor, the gate thereof inputting the second clock signal, the drain and the source thereof respectively inputting the second clock signal and being connected with the second circuit point;

an thirteenth thin film transistor, the gate thereof inputting the first clock signal, the drain and the source thereof respectively inputting the second clock signal and being connected with the second circuit point;

wherein, when working, the frequencies of the first clock signal and the second clock signal are lower than the level clock signal, and first circuit point and the second circuit point are alternately charged to the high potential by the first clock signal and the second clock signal.

Wherein, the pull-up circuit further comprises:

a fourteenth thin film transistor, the gate thereof being connected with the gate signal point, the drain and the source thereof respectively inputting the level clock signal and being connected with the n-th horizontal scanning line.

Wherein, the pull-down circuit comprises:

a fifteenth thin film transistor, the gate thereof being connected with the (n+2)-th horizontal scanning line, the drain and the source thereof being respectively connected with the n-th level horizontal scanning line and inputting the gate signal point; and a sixteenth thin film transistor, the gate thereof being connected with the (n+2)-th horizontal scanning line, the drain and the source thereof being respectively connected with the gate signal point and inputting the gate signal point.

Wherein, the first clock signal, the second clock signal, or the DC low voltage are respectively input into the multiple GOA units cascaded with each other through a common metal wire. The present invention further provides a display device, which comprises the repairable GOA circuit for flat panel display as mentioned above.

The repairable GOA circuit for flat panel display according to the present invention can make more than half of the TFT units in the single-level GOA circuit be repaired by the laser welding and laser fusing when being damaged. Therefore, the present invention can improve the yield of the GOA display panel. Using the GOA circuit according to the present invention can produce low-cost flat panel display products with narrow border or no border, which improves the yield of the GOA display panel.

BRIEF DESCRIPTION OF THE DRAWINGS

The following detailed descriptions accompanying drawings and the embodiment of the present invention make the aspect of the present invention and the other beneficial effect more obvious.

DETAILED DESCRIPTION OF THE PREFERRED EMBODIMENTS

Figure 1:
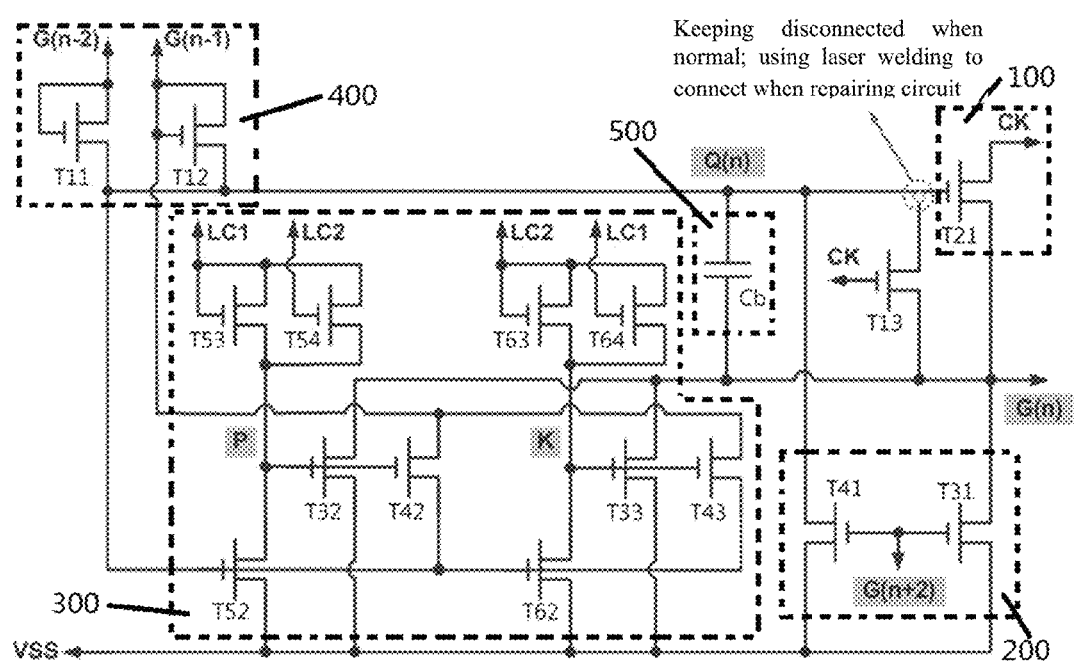
FIG. 1 is a circuit diagram of a repairable GOA circuit (single-level) for flat panel display according to an embodiment of the present invention.

Referring to FIG. 1, it is a circuit diagram of a repairable GOA circuit (single-level) for flat panel display according to an embodiment of the present invention. The repairable GOA circuit for flat panel display according to the present invention comprises multiple GOA units cascaded with each other, charging an n-th level horizontal scanning line G(n) in the display region according to the n-th level GOA unit. Both ends of the n-th level horizontal scanning line G(n) are connected with one said n-th level GOA unit. The n-th level GOA unit comprises a pull-up circuit 100, a pull-down circuit 200, a pull-down holding circuit 300, a pull-up control circuit 400, a boost strap capacitor 500, and a first thin film transistor T12. The pull-up circuit 100, the pull-down circuit 200, the pull-down holding circuit 300, and a boost strap capacitor 500 (Cb) are respectively connected with a gate signal point Q(n) and the n-th level horizontal scanning line G(n). The pull-up control circuit 400 is connected with the gate signal point Q(n). The gate of the first thin film transistor T13 inputs a level clock signal CK, and the drain and the source thereof are respectively connected with the gate signal point Q(n) and the n-th level horizontal scanning line G(n). When the n-th level GOA unit is working normally, at least one of the drain and the source of the first thin film transistor T13 keeps disconnected with the n-th level GOA unit.

In the embodiment shown in FIG. 1, in the manufacturing process of the circuit, connect the gate of the T13 to a high frequency clock signal CK, and connect the drain of the T13 to the G(n). At the position indicated by the dashed circle in FIG. 1, the metal wires connected with the source of the T13 intersect with the metal wires connected with the Q(n), which are separated by an SiNx insulating layer. In this way, in a general condition, the source of the T13 is not connected with the Q(n), but the source of the T13 can be connected to the Q(n) after repair (laser fusing). Similarly, the drain of the T13 can also be set as the condition to be connected to G (n), and the source of the T13 keeps connected with Q(n).

The pull-up circuit 100 comprises a thin film transistor T21 directly controlling to charge the n-th level horizontal scanning line G(n). The gate thereof is connected with the gate signal point Q(n), and the drain and the source of the T21 respectively input the n-th level clock signal CK and are connected with the n-th level horizontal scanning line G(n). The potential of the Q(n) of the gate of the T21 directly affects the CK charging the G(n).

The pull-down circuit 200 comprises a thin film transistor which discharges after finishing charging the G(n), which comprises a T31 discharging the G(n) and a T41 discharging the Q(n). The gate of the T31 is connected with the (n+2)-th level horizontal scanning line G(n+2), and the drain and the source thereof are respectively connected with the n-th level horizontal scanning line G(n) and input the DC low voltage VSS. The gate of the T41 is connected with the (n+2)-th level horizontal scanning line G(n+2), and the drain and the source thereof are respectively connected with the gate signal point Q(n) and input the DC low voltage VSS. The T31 and the T41 can be turned on to discharge when the G(n+2) is under high potential.

The pull-down holding circuit 300 comprises a thin film transistor which keeps the G(n) and the Q(n) under low potential when the GOA circuit is not charging. The pull-down holding circuit 300 comprises a thin film transistor T32, the gate thereof is connected with a first circuit point P, and the drain and the source thereof are respectively connected with the G(n) and input the DC low voltage VSS; a thin film transistor T33, the gate thereof is connected with a second circuit point K, and the drain and the source thereof are respectively connected with the G(n) and input the DC low voltage VSS; a thin film transistor T42, the gate thereof is connected with the first circuit point P, the drain and the source thereof are respectively connected with the G(n−1) and the gate signal point Q(n); a thin film transistor T43, the gate thereof is connected with the second circuit point K, the drain and the source thereof are respectively connected with the G(n−1) and the gate signal point Q(n); a thin film transistor T52, the gate thereof is connected with the gate signal point Q(n), the drain and the source thereof are respectively connected with the first circuit point P and input the DC low voltage VSS; a thin film transistor T62, the gate thereof is connected with the gate signal point Q(n), the drain and the source thereof are respectively connected with the second circuit point and input the DC low voltage VSS; a thin film transistor T53, the gate thereof inputs a low frequency clock signal LC1, the drain and the source thereof respectively input the low frequency clock signal LC1 and are connected with the first circuit point P; a thin film transistor T54, the gate thereof inputs a low frequency clock signal LC2, the drain and the source thereof respectively input the low frequency clock signal LC2 and are connected with the first circuit point P; a thin film transistor T63, the gate thereof inputs the low frequency clock signal LC2, the drain and the source thereof respectively input the low frequency clock signal LC2 and are connected with the second circuit point K; a thin film transistor T64, the gate thereof inputs the low frequency clock signal LC1, the drain and the source thereof respectively input the low frequency clock signal LC2 and are connected with the second circuit point K.

When working, the frequencies of the low frequency clock signal LC1 and the low frequency clock signal LC2 are lower than the high frequency clock signal CK, and first circuit point P and the second circuit point K are alternately charged to the high potential by the low frequency clock signal LC1 and the low frequency clock signal LC2, which alternately control the thin film transistors T32 & T42 or T33 & T43 to be turned on, and keep the G(n) or Q(n) under low potential in the non-charging period, which avoids the thin film transistors T32 & T42 or T33 & T43 being affected by the gate voltage stress for a long time. The thin film transistors T54 and T64 can be alternately turned on to discharge the P point or the K point according to the potential of the low frequency clock signal LC1 and LC2, which can better ensure the T32 & T42 and T33 & T43 working alternately. Therefore, it can avoid the thin film transistors being affected by the gate voltage stress for a long time, which improves the operating life time of the GOA circuit. The thin film transistor T52 is connected with the P point and the DC low voltage VSS, and the thin film transistor T62 is connected with the K point and the DC low voltage VSS. The T52 and the T62 can be turned on to turn off the T32, the T42, the T33, and the T43 not to affect the charge of Q(n) and the G(n) when Q(n) is under high potential.

The pull-up control circuit 400 comprises a thin film transistor T11 and T12, which can control to transfer the former level GOA signal to the present level GOA circuit, so that the GOA signal can be transferred level by level. The gate of the thin film transistor T11 is connected with the (n−2)-th level horizontal scanning line G(n−2), the drain and the source thereof are respectively connected with the (n−2)-th level horizontal scanning line G(n−2) and the gate signal point Q(n); the gate of the thin film transistor T12 is connected with the (n−1)-th level horizontal scanning line G(n−1), the drain and the source thereof are respectively connected with the (n−1)-th level horizontal scanning line G(n−1) and the gate signal point Q(n). One thin film transistor T12 is added in each level GOA circuit according to the present invention to charge the Q(n), which can compensate for the leakage of the Q(n) before bootstrapping, so that the Q(n) can keep more stable before bootstrapping under high temperature.

There is a capacitor Cb having bootstrapping function connected between the Q(n) and the G(n), which can boost the Q(n) potential through the coupling effect of the Cb when the G(n) potential is boosted. Therefore, it can obtain higher Q(n) potential and smaller RC delay of the GOA charging signal.

Figure 2:
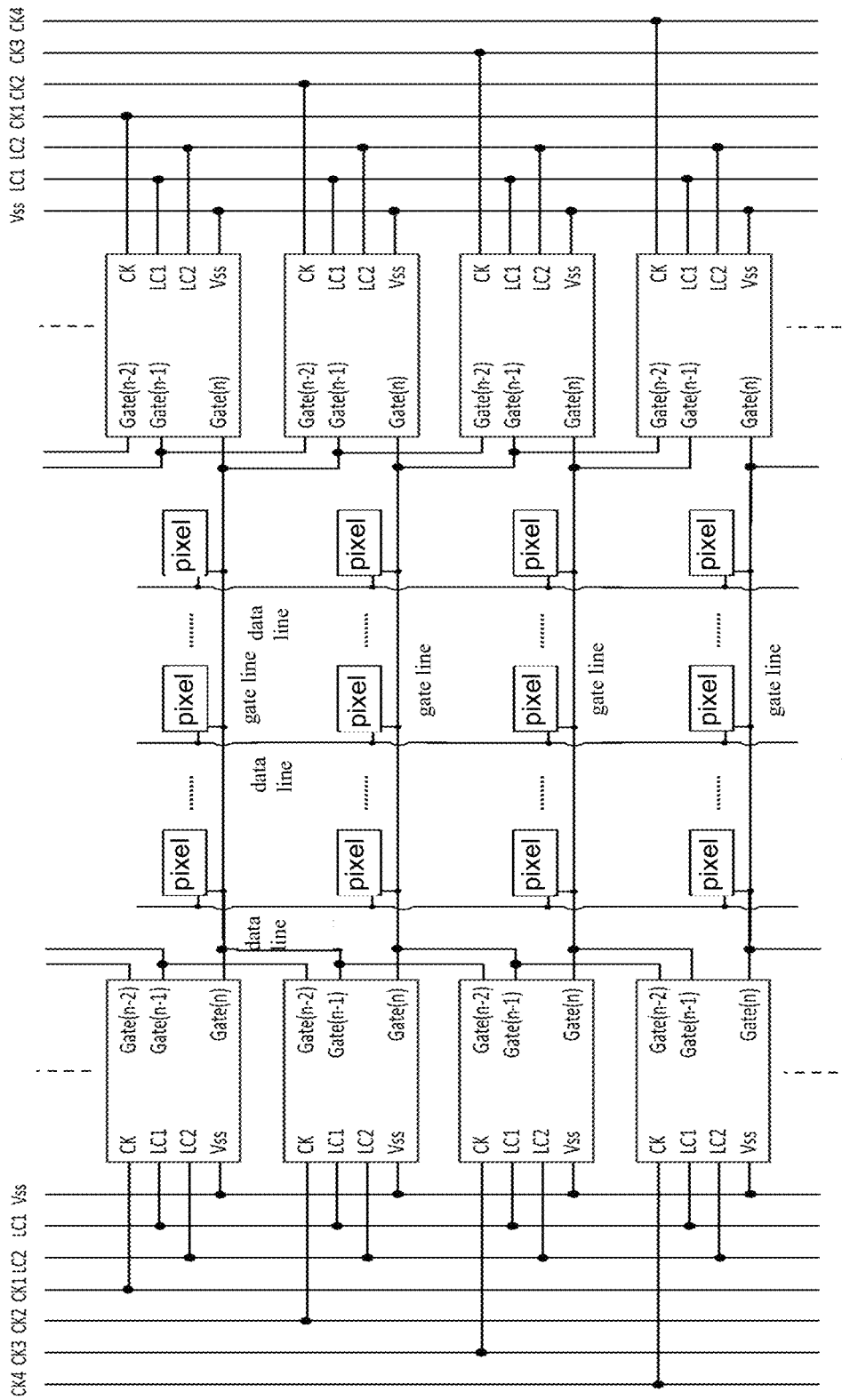
FIG. 2 is a multi-level schematic framework of a repairable GOA circuit for flat panel display according to the present invention.

Referring to 2, it is a multi-level schematic framework of a repairable GOA circuit for flat panel display according to the present invention. FIG. 2 gives a multi-level connection method of the GOA circuit according to the present invention. Both ends of each horizontal scanning line (gate line) in the display region are connected with the GOA unit circuit (the GOA unit circuit refers to FIG. 1). The GOA unit can charge and discharge the horizontal scanning line from the both sides, which can obtain more uniform charging effect. The metal wires of the low frequency clock signal LC1 and LC2, the DC low voltage VSS, and the four high frequency clock signals CK1~CK4 are placed at the peripheral of each level GOA circuit. The n-th level GOA circuit (the internal connection thereof refers to FIG. 1) respectively receives the LC1, the LC2, the VSS, one CK signal of the CK1~CK4, the G(n−2) signal generated from the (n−2)-th level GOA circuit, the G(n−1) signal generated from the (n−1)-th level GOA circuit, and the G(n+2) signal generated from the (n+2)-th level GOA circuit, and generates the G(n) signal. The multi-level connection method shown in FIG. 2 can ensure the GOA signal being transferred level by level, and each level GOA circuit can charge and discharge the horizontal scanning line (gate line) in the display region from the both sides, which turns on the pixel electrode and inputs the data signal through the data line.

The repairable GOA circuit for flat panel display according to the present invention can be produced on the substrate around the display area using the original process of the flat display panel, which can replace the external IC to drive the horizontal scanning line. The present invention is especially suitable for the production of the flat panel display products with narrow border or no border.

Figure 3:
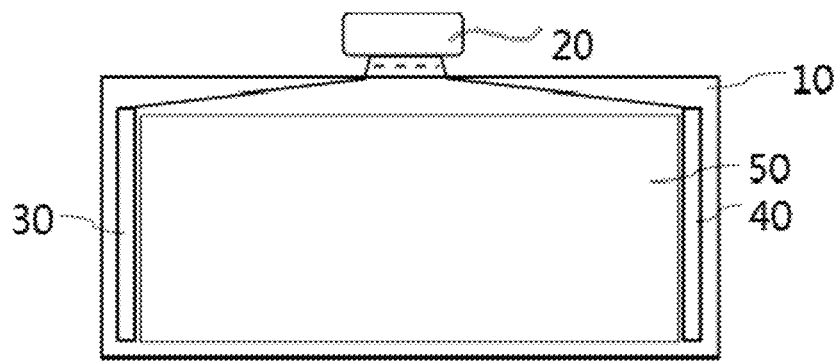
FIG. 3 is a schematic view illustrating the structure of a display device with the repairable GOA circuit for flat panel display according to the present invention.

Referring to FIG. 3, it is a schematic view illustrating the structure of a display device with the repairable GOA circuit for flat panel display according to the present invention. In FIG. 3, the flat display device comprises a display substrate 10. The driving control board 20 above the display substrate 10 provides the driving signal and the control signal for the display substrate 10. The left region 30 and the right region 40 of the display substrate 10 are produce with the GOA circuit, which can drive the horizontal scanning line in the display region 50 from the left and the right directions. The GOA circuit receives the input signal of the driving control board 20 and generates the control signal of the horizontal scanning line level by level, which can control to turn on the pixel in the display region 50 gradually.

Figure 4:
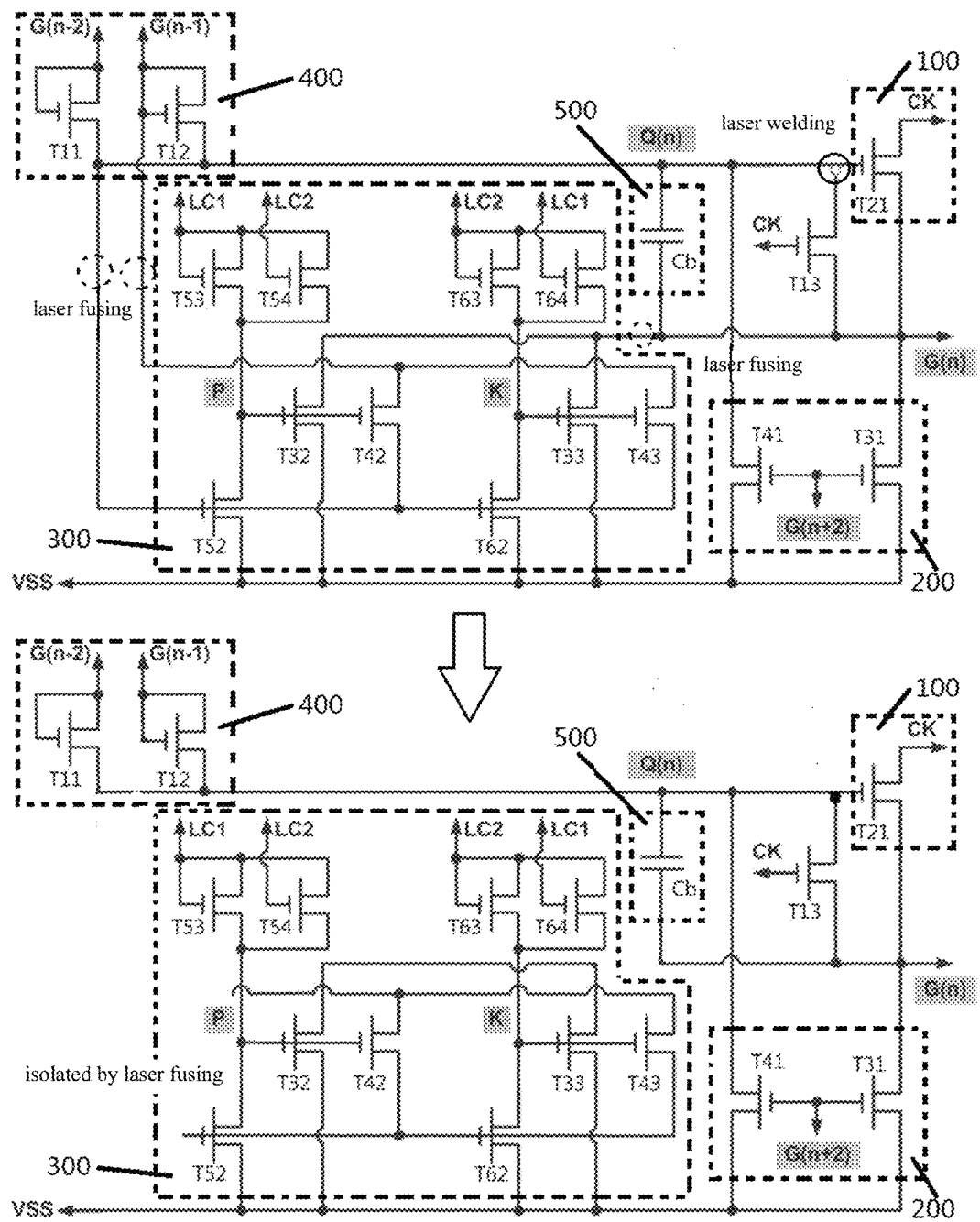
FIG. 4 is a schematic repair process of the repairable GOA circuit for flat panel display according to the present invention.

Referring to FIG. 4, it is a schematic repair process of the repairable GOA circuit for flat panel display according to the present invention, which can be understood by accompanying with FIGS. 1 and 2. In the GOA circuit shown in the top of FIG. 4, when the part of the thin film transistors T53, T54, T63, T64, T32, T42, T33, T43, T52, and T62 in the circuit is abnormal, namely, when the pull-down holding circuit 300 is abnormal, it can be repaired by laser welding and laser fusing, and the original circuit can be transformed to the GOA circuit shown in the bottom of FIG. 4. In FIG. 4, when the pull-down holding circuit 300 is abnormal, isolate the pull-down holding circuit 300 from the n-th level GOA unit by laser fusing the location marked by dotted circle, so that the abnormal pull-down holding circuit 300 will not affect the potential of the Q(n) and the G(n). And then, completely connect the thin film transistor T13 to the n-th level GOA unit by laser welding the location marked by solid circle. In the repaired GOA circuit shown in the bottom of FIG. 4, the low potential of the Q(n) in the non-charging period can be kept using the thin film transistor T13 (the gate thereof inputs the high frequency level clock signal CK, and the drain and the source thereof are respectively connected with the Q(n) and the G(n)), and the low potential of the G(n) in the non-charging period can be kept using the thin film transistor, which keeps the G(n) potential in the connected GOA circuit on the other side of the horizontal scanning line (gate line). Because the both ends of the horizontal scanning line are connected with one GOA unit, as long as one GOA unit is working normally, the abnormal GOA unit can be repaired according to the FIG. 4. Therefore, the GOA circuit according to the present invention has a certain repair ability, more than half of the TFT units in the single-level GOA circuit have chance to be repaired by the laser welding and laser fusing when being damaged.

Figure 5:
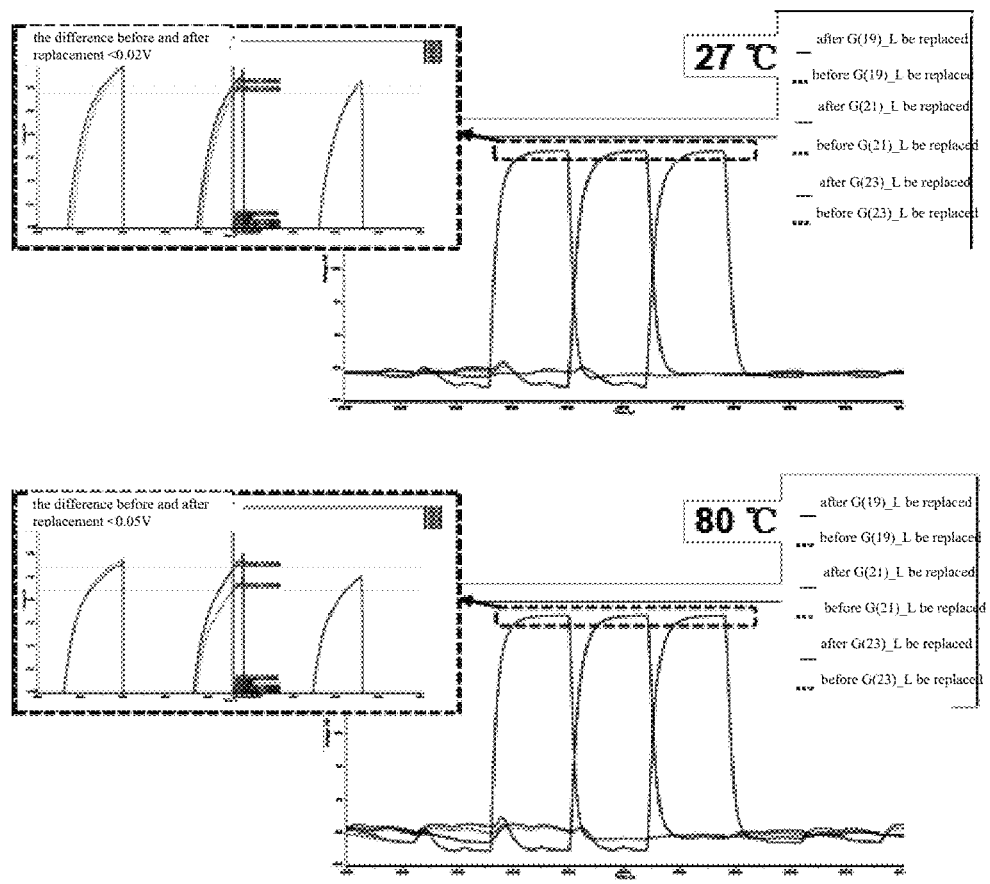
FIG. 5 is a schematic testing result using Eldo-SPICE software to test the repair function of the repairable GOA circuit for flat panel display according to the present invention.

Referring to FIG. 5, it is a schematic testing result using Eldo-SPICE software to test the repair function of the repairable GOA circuit for flat panel display according to the present invention. It uses the Eldo-SPICE software to simulate the multi-level GOA circuit charging the horizontal scanning line. Assume the part of thin film transistors T53, T54, T63, T64, T32, T42, T33, T43, T52, and T62 in the left of the twenty-first level GOA circuit is abnormal, replace the left twenty-first level GOA circuit by the repaired circuit (repair method as shown in FIG. 4). After repair, at 27° C. and 80° C., the output G(21)_L of the left gate driver circuit of the twenty-first level, the output G(19)_L of the left GOA circuit of the former nineteenth level, and the output G(23)_L of the left GOA circuit of the former twenty-third level only have minor deviations comparing to the output of the GOA before repair. The functions of the GOA circuit are basically recovered.

In summary, the repairable GOA circuit for flat panel display according to the present invention can make more than half of the TFT units in the single-level GOA circuit be repaired by the laser welding and laser fusing when being damaged. Therefore, the present invention can improve the yield of the GOA display panel. Using the GOA circuit according to the present invention can produce low-cost flat panel display products with narrow border or no border, which improves the yield of the GOA display panel.

In summary, many other possible modifications and variations can be made by those skilled in the art without departing from the spirit and scope of the invention as hereinafter claimed, and those modifications and variations are considered encompassed in the scope of protection defined by the clams of the present invention.

What is claimed is:

1. A repairable gate on array (GOA) circuit for flat panel display, comprising multiple GOA units cascaded with each other, charging an n-th level horizontal scanning line in the display region according to the n-th level GOA unit, both ends of the n-th level horizontal scanning line being connected with one said n-th level GOA unit, the n-th level GOA unit comprising a pull-up circuit, a pull-down circuit, a pull-down holding circuit, a pull-up control circuit, a boost strap capacitor, and a first thin film transistor; the pull-up circuit, the pull-down circuit, the pull-down holding circuit, and a boost strap capacitor being respectively connected with a gate signal point and the n-th level horizontal scanning line, the pull-up control circuit being connected with the gate signal point; the gate of the first thin film transistor inputting a level clock signal, the drain and the source thereof being respectively connected with the gate signal point and the n-th level horizontal scanning line; wherein, when the n-th level GOA unit is working normally, at least one of the drain and the source of the first thin film transistor keeps disconnected with the n-th level GOA unit, when the pull-down holding circuit is abnormal, isolate the pull-down holding circuit from the n-th level GOA unit, and completely connect the first thin film transistor to the n-th level GOA unit to finish repair, wherein the pull-up control circuit comprises: a second thin film transistor, the gate thereof being connected with the (n−2)-th level horizontal scanning line, the drain and the source thereof being respectively connected with the (n−2)-th level horizontal scanning line and the gate signal point; and a third thin film transistor, the gate thereof being connected with the (n−1)-th level horizontal scanning line, the drain and the source thereof being respectively connected with the (n−1)-th level horizontal scanning line and the gate signal point.

2. The repairable GOA circuit for flat panel display as claimed in claim 1, wherein the pull-down holding circuit is isolated from the n-th level GOA unit by laser fusing.

3. The repairable GOA circuit for flat panel display as claimed in claim 1, wherein the metal wires connected with the drain or the source of the first thin film transistor intersect with the metal wires connected with the corresponding gate signal point or the n-th level horizontal scanning line, which are separated by an insulating layer.

4. The repairable GOA circuit for flat panel display as claimed in claim 3, wherein the first thin film transistor is completely connected to the n-th level GOA unit by laser welding.

5. A repairable gate on array (GOAO circuit for flat panel display, comprising multiple GOA units cascaded with each other, charging an n-th level horizontal scanning line in the display region according to the n-th level GOA unit, both ends of the n-th level horizontal scanning line being connected with one said n-th level GOA unit, the n-th level GOA unit comprising a pull-up circuit, a pull-down circuit, a pull-down holding circuit, a pull-up control circuit, a boost strap capacitor, and a first thin film transistor; the pull-up circuit, the pull-down circuit, the pull-down holding circuit, and a boost strap capacitor being respectively connected with a gate signal point and the n-th level horizontal scanning line, the pull-up control circuit being connected with the gate signal point; the gate of the first thin film transistor inputting a level clock signal, the drain and the source thereof being respectively connected with the gate signal point and the n-th level horizontal scanning line; wherein, when the n-th level GOA unit is working normally, at least one of the drain and the source of the first thin film transistor keeps disconnected with the n-th level GOA unit, when the pull-down holding circuit is abnormal, isolate the pull-down holding circuit from the n-th level GOA unit, and completely connect the first thin film transistor to the n-th level GOA unit to finish repair, wherein the pull-down holding circuit further comprises: a fourth thin film transistor, the gate thereof being connected with a first circuit point, the drain and the source thereof being respectively connected with the n-th level horizontal scanning line and inputting a DC low voltage; a fifth thin film transistor, the gate thereof being connected with a second circuit point, the drain and the source thereof being respectively connected with the n-th level horizontal scanning line and inputting the DC low voltage; a sixth thin film transistor, the gate thereof being connected with the first circuit point, the drain and the source thereof being respectively connected with the (n−1)-th level horizontal scanning line and inputting the gate signal point; a seventh thin film transistor, the gate thereof being connected with the second circuit point, the drain and the source thereof being respectively connected with the (n−1)-th level horizontal scanning line and inputting the gate signal point; an eighth thin film transistor, the gate thereof being connected with the gate signal point, the drain and the source thereof being respectively connected with the first circuit point and inputting the DC low voltage; an ninth thin film transistor, the gate thereof being connected with the gate signal point, the drain and the source thereof being respectively connected with the second circuit point and inputting the DC low voltage; an tenth thin film transistor, the gate thereof inputting a first clock signal, the drain and the source thereof inputting the first clock signal and being respectively connected with the first circuit point; an eleventh thin film transistor, the gate thereof inputting a second clock signal, the drain and the source thereof inputting the first clock signal and being respectively connected with the first circuit point; an twelfth thin film transistor, the gate thereof inputting the second clock signal, the drain and the source thereof respectively inputting the second clock signal and being connected with the second circuit point; and an thirteenth thin film transistor, the gate thereof inputting the first clock signal, the drain and the source thereof respectively inputting the second clock signal and being connected with the second circuit point; wherein, when working, the frequencies of the first clock signal and the second clock signal are lower than the level clock signal, and first circuit point and the second circuit point are alternately charged to the high potential by the first clock signal and the second clock signal.

6. The repairable GOA circuit for flat panel display as claimed in claim 1, wherein the pull-up circuit further comprises: a fourteenth thin film transistor, the gate thereof being connected with the gate signal point, the drain and the source thereof respectively inputting the level clock signal and being connected with the n-th horizontal scanning line.

7. The repairable GOA circuit for flat panel display as claimed in claim 1, wherein the pull-down circuit comprises: a fifteenth thin film transistor, the gate thereof being connected with the (n+2)-th horizontal scanning line, the drain and the source thereof being respectively connected with the n-th level horizontal scanning line and inputting the gate signal point; and a sixteenth thin film transistor, the gate thereof being connected with the (n+2)-th horizontal scanning line, the drain and the source thereof being respectively connected with the gate signal point and inputting the gate signal point.

8. The repairable GOA circuit for flat panel display as claimed in claim 1, wherein the first clock signal, the second clock signal, or the DC low voltage are respectively input into the multiple GOA units cascaded with each other through a common metal wire.

9. A repairable gate on array (GOA) circuit for flat panel display, comprising multiple GOA units cascaded with each other, charging an n-th level horizontal scanning line in the display region according to the n-th level GOA unit, both ends of the n-th level horizontal scanning line being connected with one said n-th level GOA unit, the n-th level GOA unit comprising a pull-up circuit, a pull-down circuit, a pull-down holding circuit, a pull-up control circuit, a boost strap capacitor, and a first thin film transistor; the pull-up circuit, the pull-down circuit, the pull-down holding circuit, and a boost strap capacitor being respectively connected with a gate signal point and the n-th level horizontal scanning line, the pull-up control circuit being connected with the gate signal point; the gate of the first thin film transistor inputting a level clock signal, the drain and the source thereof being respectively connected with the gate signal point and the n-th level horizontal scanning line; wherein, when the n-th level GOA unit is working normally, at least one of the drain and the source of the first thin film transistor keeps disconnected with the n-th level GOA unit, when the pull-down holding circuit is abnormal, isolate the pull-down holding circuit from the n-th level GOA unit, and completely connect the first thin film transistor to the n-th level GOA unit to finish repair;

wherein, the pull-down holding circuit is isolated from the n-th level GOA unit by laser fusing;

wherein, the metal wires connected with the drain or the source of the first thin film transistor intersect with the metal wires connected with the corresponding gate signal point or the n-th level horizontal scanning line, which are separated by an insulating layer; wherein, the first thin film transistor is completely connected to the n-th level GOA unit by laser welding; wherein, the pull-up control circuit comprises: a second thin film transistor, the gate thereof being connected with the (n−2)-th level horizontal scanning line, the drain and the source thereof being respectively connected with the (n−2)-th level horizontal scanning line and the gate signal point;

and a third thin film transistor, the gate thereof being connected with the (n−1)-th level horizontal scanning line, the drain and the source thereof being respectively connected with the (n−1)-th level horizontal scanning line and the gate signal point.

10. The repairable GOA circuit for flat panel display as claimed in claim 9, wherein the pull-down holding circuit further comprises: a fourth thin film transistor, the gate thereof being connected with a first circuit point, the drain and the source thereof being respectively connected with the n-th level horizontal scanning line and inputting a DC low voltage; a fifth thin film transistor, the gate thereof being connected with a second circuit point, the drain and the source thereof being respectively connected with the n-th level horizontal scanning line and inputting the DC low voltage; a sixth thin film transistor, the gate thereof being connected with the first circuit point, the drain and the source thereof being respectively connected with the (n−1)-th level horizontal scanning line and inputting the gate signal point; a seventh thin film transistor, the gate thereof being connected with the second circuit point, the drain and the source thereof being respectively connected with the (n−1)-th level horizontal scanning line and inputting the gate signal point; an eighth thin film transistor, the gate thereof being connected with the gate signal point, the drain and the source thereof being respectively connected with the first circuit point and inputting the DC low voltage; an ninth thin film transistor, the gate thereof being connected with the gate signal point, the drain and the source thereof being respectively connected with the second circuit point and inputting the DC low voltage; an tenth thin film transistor, the gate thereof inputting a first clock signal, the drain and the source thereof inputting the first clock signal and being respectively connected with the first circuit point; an eleventh thin film transistor, the gate thereof inputting a second clock signal, the drain and the source thereof inputting the first clock signal and being respectively connected with the first circuit point; an twelfth thin film transistor, the gate thereof inputting the second clock signal, the drain and the source thereof respectively inputting the second clock signal and being connected with the second circuit point; and an thirteenth thin film transistor, the gate thereof inputting the first clock signal, the drain and the source thereof respectively inputting the second clock signal and being connected with the second circuit point; wherein, when working, the frequencies of the first clock signal and the second clock signal are lower than the level clock signal, and first circuit point and the second circuit point are alternately charged to the high potential by the first clock signal and the second clock signal.

11. The repairable GOA circuit for flat panel display as claimed in claim 9, wherein the pull-up circuit further comprises: a fourteenth thin film transistor, the gate thereof being connected with the gate signal point, the drain and the source thereof respectively inputting the level clock signal and being connected with the n-th horizontal scanning line.

12. The repairable GOA circuit for flat panel display as claimed in claim 9, wherein the pull-down circuit comprises: a fifteenth thin film transistor, the gate thereof being connected with the (n+2)-th horizontal scanning line, the drain and the source thereof being respectively connected with the n-th level horizontal scanning line and inputting the gate signal point; and a sixteenth thin film transistor, the gate thereof being connected with the (n+2)-th horizontal scanning line, the drain and the source thereof being respectively connected with the gate signal point and inputting the gate signal point.

13. The repairable GOA circuit for flat panel display as claimed in claim 9, wherein the first clock signal, the second clock signal, or the DC low voltage are respectively input into the multiple GOA units cascaded with each other through a common metal wire.

14. A display device, comprising the repairable GOA circuit for flat panel display as claimed in claim 1.

\* \* \* \* \*